US011829960B1

(12) United States Patent
Bolt et al.

(10) Patent No.: US 11,829,960 B1
(45) Date of Patent: *Nov. 28, 2023

(54) SUPPLEMENTAL DATA TRANSMISSION FOR NETWORK TRANSACTIONS

(71) Applicant: United Services Automobile Association (USAA), San Antonio, TX (US)

(72) Inventors: Dorothy Jean Bolt, San Antonio, TX (US); Michael L. Hertz, San Antonio, TX (US); Joseph Matthew Doddato, Boerne, TX (US); Gunjan C. Vijayvergia, San Antonio, TX (US); James Malcolm Spears, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/410,706

(22) Filed: Aug. 24, 2021

Related U.S. Application Data

(63) Continuation of application No. 15/915,900, filed on Mar. 8, 2018, now Pat. No. 11,132,653.

(Continued)

(51) Int. Cl.
*G06Q 20/02* (2012.01)
*G06Q 20/32* (2012.01)

(52) U.S. Cl.
CPC ......... *G06Q 20/02* (2013.01); *G06Q 20/3255* (2013.01)

(58) Field of Classification Search
None
See application file for complete search history.

(56) References Cited

U.S. PATENT DOCUMENTS

| 7,802,008 | B2 * | 9/2010 | Akinlar | H04L 47/2441 |
| | | | | 709/235 |
| 8,474,001 | B2 * | 6/2013 | Thompson | H04N 21/6336 |
| | | | | 725/95 |

(Continued)

OTHER PUBLICATIONS

Ledford et al., "U.S. Real-Time Payments Business Playbook," The Clearing House, Version 1.01, dated Mar. 2016, 45 pages.

*Primary Examiner* — Bruce I Ebersman
*Assistant Examiner* — Matthew Cobb
(74) *Attorney, Agent, or Firm* — Fish & Richardson P.C.

(57) ABSTRACT

Techniques are described for using a supplemental data layer of a real time payments channel to send data. For example, an entity may request a transaction with another entity, and the transaction may be performed using a channel that includes a supplemental data layer. Supplemental data, in addition to the data for the transaction itself, may be communicated using the supplemental data layer to entities involved in the transaction, and/or to third parties. The supplemental data may be sent in real time with respect to the sending of the data for the transaction. In some instances, supplemental data layer is present in one or both directions in the two-way communications between the entities involved in the transaction. The supplemental data layer can be leveraged to provide additional information and/or services to a user involved in the transaction.

9 Claims, 5 Drawing Sheets

Related U.S. Application Data

(60) Provisional application No. 62/469,035, filed on Mar. 9, 2017.

(56) References Cited

U.S. PATENT DOCUMENTS

| | | |
|---|---|---|
| 8,651,373 B1 | 2/2014 | Block |
| 10,997,662 B1* | 5/2021 | Warfel ............... G06Q 30/0269 |
| 11,132,653 B1 | 9/2021 | Bolt et al. |
| 2002/0029194 A1* | 3/2002 | Lewis .................... G06Q 20/10 |
| | | 705/40 |
| 2002/0065707 A1 | 5/2002 | Lancaster et al. |
| 2007/0198432 A1 | 8/2007 | Pitroda et al. |
| 2009/0048944 A1* | 2/2009 | Eagle ..................... G06Q 30/06 |
| | | 705/1.1 |
| 2010/0131308 A1* | 5/2010 | Collopy ................. G06Q 30/04 |
| | | 701/31.4 |
| 2012/0036038 A1* | 2/2012 | Farmer ............. G06Q 30/0204 |
| | | 705/26.7 |
| 2012/0323726 A1 | 12/2012 | Wilson |
| 2016/0180348 A1 | 6/2016 | Windley |
| 2017/0220684 A1 | 8/2017 | Toupin et al. |
| 2017/0286922 A1 | 10/2017 | Ledder et al. |
| 2018/0158039 A1* | 6/2018 | Cox ....................... G06Q 30/06 |

* cited by examiner

SUPPLEMENTAL DATA TRANSMISSION FOR NETWORK TRANSACTIONS

CROSS-REFERENCE TO RELATED APPLICATIONS

This application is a continuation application of and claims priority under 35 U.S.C. § 120 to U.S. application Ser. No. 15/915,900, filed on Mar. 8, 2018, which claims priority to, U.S. Provisional Patent Application Ser. No. 62/469,035, titled "Supplemental Data for Network Transactions," which was filed on Mar. 9, 2017, the entirety of each of which are incorporated by reference into the present disclosure.

BACKGROUND

Currently, various systems are available to perform settlement between institutions following a purchase or other transaction. Such systems include the Automated Clearing House (ACH) and the Society for Worldwide Interbank Financial Telecommunication (SWIFT) network. For example, a user may attempt to make a purchase from a merchant. A system may check the user's bank to see if the user's specified account holds available funds to cover the transaction. If so, the transaction may be approved. The user's account may be debited, and a settlement process may later be performed to move the appropriate funds from the user's bank to the merchant's bank. The Clearing House (TCH) has proposed a real time payments (RTP) channel that includes the ability to send other data in addition to the information needed to perform the settlement.

SUMMARY

Implementations of the present disclosure are generally directed communicating data over networks. More particularly, implementations of the present disclosure are directed to communicating data between entities using a supplemental data layer of a channel used to communicate transaction information between entities.

In general, implementations of innovative aspects of the subject matter described in this specification can be embodied in a method that includes the following operations: detecting a transaction for a first item, wherein the transaction is executed based on transaction data that is transmitted, over at least one network, using a transaction data layer of a communication channel that provides the transaction data layer and a supplemental data layer; generating supplemental data that describes a second item associated with the first item; and transmitting the supplemental data to at least one entity involved in the transaction, wherein the supplemental data is transmitted using the supplemental data layer of the communication channel, and wherein the transmitting of the supplemental data is performed in real time in response to detecting the transaction.

These and other implementations can each optionally include one or more of the following innovative aspects: the generating of the supplemental data is performed in real time in response to detecting the transaction; the supplemental data includes an offer of the second item to the at least one entity; the second item is a policy for the first item; the supplemental data includes a description of the policy to the at least one entity; the second item is an account to be opened to facilitate the transaction; the supplemental data includes an offer to the at least one entity to open the account; the first item is a vehicle; the operations further include establishing an interactive session with the at least one entity using the supplemental data layer of the communication channel; and/or the supplemental data is transmitted to the at least one entity during the interactive session.

Other implementations of any of the above aspects include corresponding methods, apparatus, and/or computer programs that are configured to perform the actions of the system. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The implementations described herein provide at least the following technical advantages and/or technical improvements compared to previously available techniques.

Through use of a channel that includes a supplemental data layer for communicating supplemental data in real time with respect to the communication of transaction data, implementations communicate information more efficiently compared to traditional solutions that require a separate channel to communicate supplemental data. Thus, implementations provide for more efficient use of network bandwidth than traditional solutions. Moreover, by using the channel to communicate supplemental data in real time with respect to transaction data, implementations enable the communication of supplemental data that is more timely and relevant, compared to traditional solutions in which data sent asynchronously with respect to the transaction may be out-of-date or less time-relevant. Using the channel also enables implementations to execute and automate dependent secondary (e.g., non-monetary) transactions in a process with (e.g., in real time with) a primary (e.g., monetary) transaction. The presence of the supplemental data allows for non-monetary parts of the process to be linked to the monetary part. For example, once a payoff is processed and settled in real time, a title transfer transaction can be initiated in an automated fashion without additional manual or separate processing using the supplemental data communicated in the supplemental data layer, such data being the asset (e.g., vehicle or home) title itself, title identifiers, metadata, and so forth.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to systems, devices, methods, and computer-readable media for using a supplemental data layer of a real time payments (RTP) channel to send data. For example, a user may request a transaction with another party, such as another user or an entity (e.g., a merchant). The settlement for the transaction (e.g., transfer of funds between financial institutions) may be performed using a payment channel that includes a supplemental data layer, such as the channel provided by The Clearing House (TCH). Additional data, in addition to the data associated with the funds transfer itself, may be communicated in the supplemental data layer of the channel to one or more of the entities involved in the transaction, and/or to a third party. The additional data may be sent in real time with respect to the sending of the payment to settle the transaction. In some instances, supplemental data layer is present in one or both directions in the two-way payment communications between the payer and payee, e.g., the customer and merchant banks. Implementations can leverage the supplemental data layer to offer additional products and/or services to a user involved in the transaction, or to send other types of data. Such products and/or services may be offered in real time with respect to the transaction processing using the channel. Implementations may also leverage the supplemental data layer to provide improved user experience in other ways.

In some instances, the data sent over the supplemental data layer may be used to trigger real time communications with a user, such as Short Message Service (SMS) or Multimedia Messaging Service (MMS) messages, messages sent to a (e.g., mobile) application, and so forth. The data received on the supplemental data layer of the channel can be captured, stored, and/or processed to provide a richer user experience, offer additional products and services, and/or perform other operations. Various types and/or formats of data may be sent over the supplemental data layer, including but not limited to unformatted data, Hypertext Markup Language (HTML) data, HTML5 data, text data, video data, audio data, active or executable data (e.g., dynamic scripts, code), and so forth.

In some implementations, the supplemental data layer is used to communicate additional data to and/or from entities involved in a transaction (e.g., such as customers and merchants), where the communicated additional data is other than the data that is sent to process the payment itself. Additional data may also be communicated to and/or from third parties not directly involved in the transaction, using the supplemental data layer. In some implementations, the real time aspect of the channel, and its supplemental data layer, may be leveraged to monitor transactions and intercede, when appropriate, to perform operations in real time to provide services to a user, such as real time financial counseling. In some implementations, the data communicated over the supplemental data layer may be collected and analyzed (e.g., off line, not in real time) to offer richer experiences to users, generate product offers to users, determine discounts on services for users, and so forth.

As used herein, supplemental data generally describes data other than data that is sent to perform, and/or settle, a transaction such as a purchase. For example, transaction data may be data for a funds transfer performed as a settlement between two institutions, such as a buyer's bank and a seller's bank. The supplemental data layer may be used to send supplemental data such as an offer, sent to the buyer, to purchase another product. The other product may be different than the particular product purchased in the transaction, but may be related in some way. For example, based on a vehicle purchase, the supplemental data layer may be used to send an offer to purchase accessory products such as seat covers, an in-vehicle audio system, and so forth. Accordingly, the supplemental data sent over the supplemental data layer may be different from the transactional data, but may be peripherally and/or indirectly related to the transactional data. Supplemental data may also be described as rich data, and the supplemental data layer may also be described as a rich data layer.

In some implementations, the supplemental data is sent over the supplemental data layer in real time with respect to detecting the transaction and/or with respect to the sending of the transactional data over the communication channel. A real time process describes a process that is performed in response to detecting a triggering event, in which the real time process is performed without any unnecessary delay following the triggering event, apart from the delay that is incurred due to the limitations (e.g., speed, bandwidth) of any networks being used, transfer of data between system components, memory access speed, processing speed, and/or computing resources. A real time process may be performed within a short period of time following the detection of the triggering event, and/or may be performed at least partly concurrently with the triggering event. A triggering event may be the receipt of a communication, the detection of a particular system state, and/or other types of events. In some instances, a real time process is performed within a same execution path, such as within a same process or thread, as the triggering event. In some instances, a real time process is performed by a different process or thread that is created or requested by a process that detects the triggering event. A real time process may also be described as synchronous with respect to the triggering event.

In some implementations, the generation and/or transmission of the supplemental data, using the supplemental data layer of the communication channel, is performed in real time with respect to detecting the associated transaction and/or with respect to the transmission of the transaction data for the transaction using the transaction data layer. For example, the supplemental data can be generated and/or transmitted in response to a triggering event that is the detection of the transaction that uses the communication channel to send the associated transaction data. A triggering event may also be a determination that the transaction data satisfies particular criteria, either alone or in combination with other data.

Figure 1:
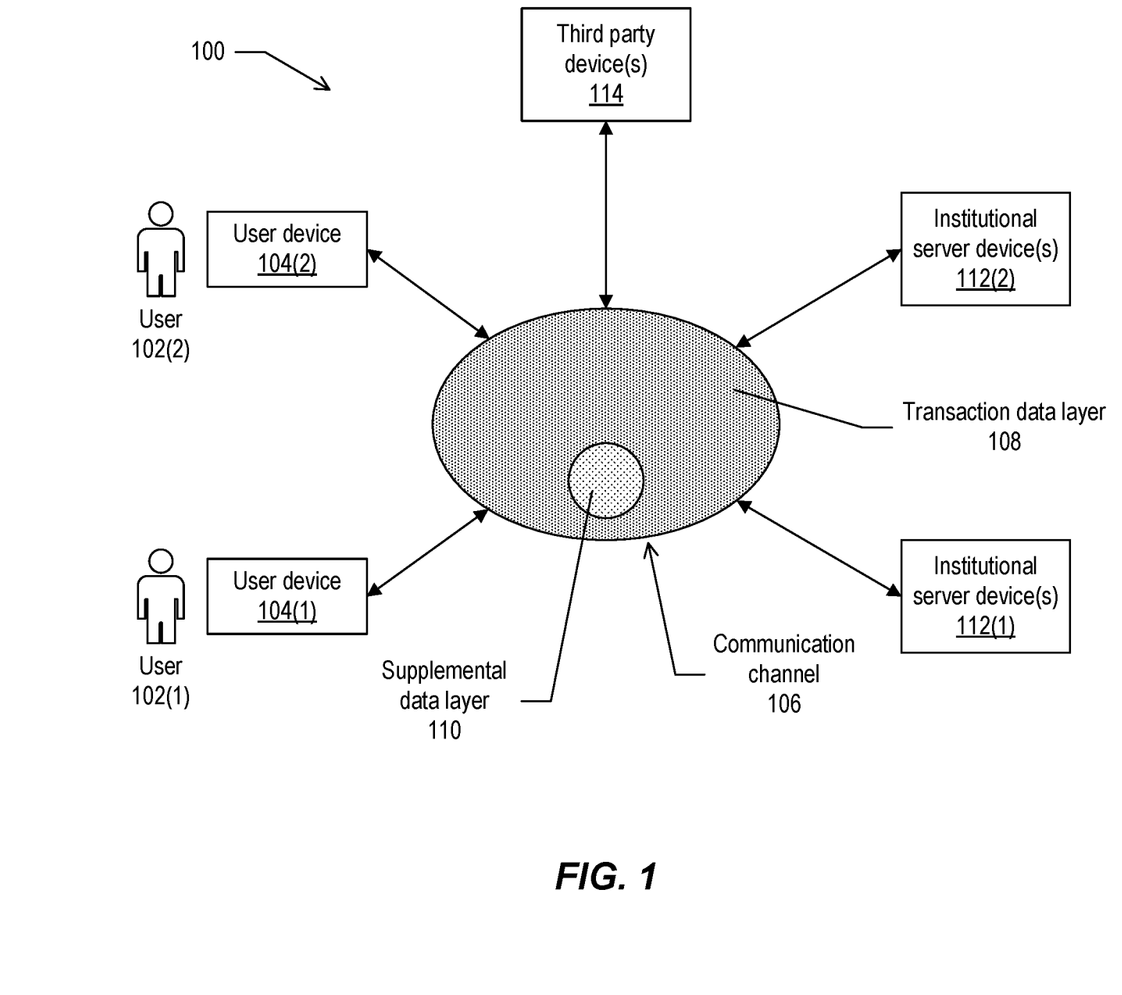
FIG. 1 depicts an example system for using a supplemental data layer of a communication channel, according to implementations of the present disclosure.

FIG. 1 depicts an example system 100 for using a supplemental data layer of a communication channel, according to implementations of the present disclosure. In the example shown, the system 100 includes user device(s) 104(1) and 104(2) that are owned, operated, and/or otherwise associated, respectively, with users 102(1) and 102(2). For example, the users 102(1) and 102(2) may be a buyer and seller that are engaged in a transaction, such as a purchase of a product. The user devices 104(1) and 104(2) may be any suitable type of computing device. In some instances, one or both of the user devices 104(1) and 104(2) are portable computing devices, such as a smartphone, tablet computer, wearable computer, and so forth. In one example, the user device 104(1) may be a purchaser's portable computing device, and the user device 104(2) may be a point-of-sale (POS) such as a dedicated POS terminal or a portable computing device (e.g., smartphone or tablet) running software that enables the device 104(2) to operate as a POS device of a merchant or other seller.

The example system 100 also includes institutional server devices 112(1) and 112(2), and third party device(s) 114. Each of these may include any suitable number and/or type of computing device, including device(s) that provide distributed computing services (e.g., for cloud computing). The institutional server device(s) 112(1) and 112(2) may be operated by, or otherwise associated with, institutions involved in settlement of one or more transactions, such as banks, credit unions, and so forth. In some instances, the third party device(s) 114 may be operated by, or otherwise associated with, entities other than the institutions associated with the device(s) 112(1) and 112(2). In some instances, the third party device(s) 114 may be operated by, or otherwise associated with, one or both of the institutions associated with the device(s) 112(1) and 112(2).

The computing devices of the example system 100, such as the devices 104(1), 104(2), 112(1), 112(2), and/or 114, may communicate using a communication channel 106. In some examples, the communication channel 106 is a channel that supports settlement or other transaction processing between institutions, such as a channel provided by TCH. The channel 106 may include a transaction data layer 108 to communicate transaction data, such as funds transfer data communicated as part of a settlement process between the institutional server device(s) 112(1) and 112(2). The channel 106 may also include a supplemental data layer 110 to communicate supplemental data other than the transaction data.

In some instances, any of the computing devices of the system 100 may monitor and access the data being sent over the transaction data layer 108 and the supplemental data layer 110. In some instances, the devices may have differing privileges to access the communicated data. For example, the device(s) 112(1) and 112(2) may be permitted to access the transaction data sent over the transaction data layer 108, but other device(s) may not be permitted to access such data, and may access the supplemental data sent over the supplemental data layer 110.

Figure 2:
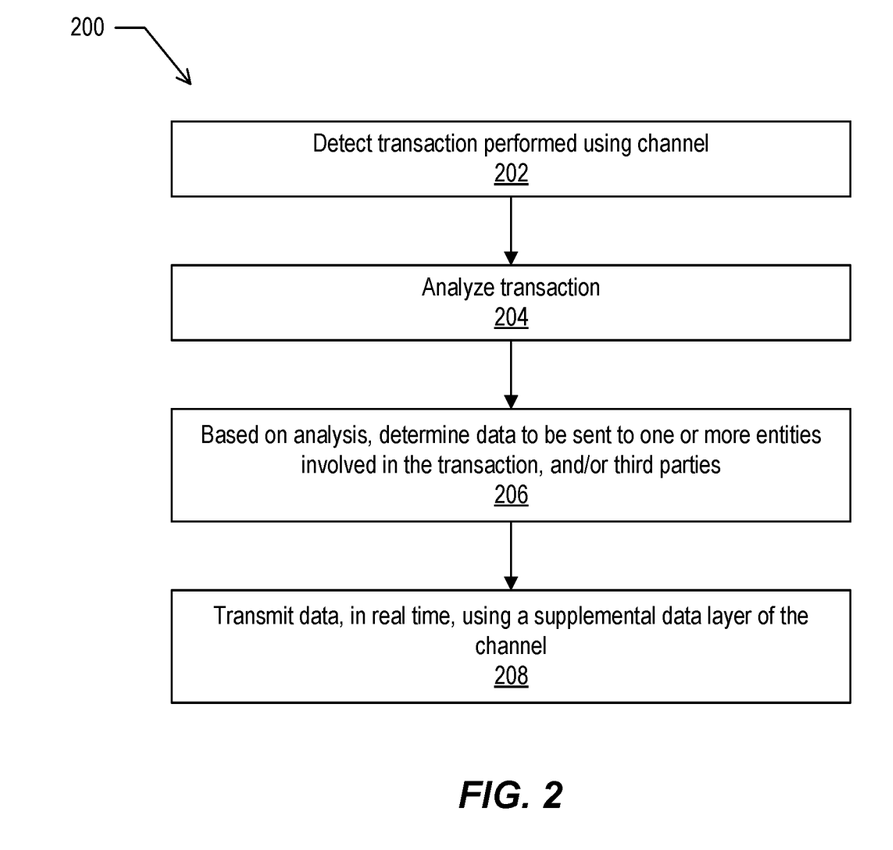
FIG. 2 depicts a flow diagram of an example process for communicating data over a supplemental data layer of a communication channel, according to implementations of the present disclosure.

FIG. 2 depicts a flow diagram 200 of an example process for communicating data over a supplemental data layer of a communication channel, according to implementations of the present disclosure. Operations of the process may be performed by software module(s) executing on one or more of the user device 104(1), the user device 104(2), the institutional server device(s) 112(1), the institutional server device(s) 112(2), the third party device(s) 114, and/or elsewhere.

A transaction is detected (202), the transaction being performed and/or settled using the transaction data layer 108 of the channel 106. The transaction is analyzed (204). Based on the result of the analysis, supplemental data is generated, retrieved from storage, or otherwise determined (206). The supplemental data is determined to be sent to recipient entities, such as one or more of the entities involved in the transaction and/or one or more third parties (e.g., entities not directly involved in the transaction). The supplemental data is transmitted (208) to the determined recipient entities. In some implementations, the supplemental data is determined and/or transmitted to the recipient entities in real time with respect to the transaction and/or its settlement.

Implementations support the sending of supplemental data to recipient entities in various scenarios. For example, as part of a transaction to purchase a vehicle, payment may be processed using the channel 106, and the supplemental data layer 110 could be used for releasing and/or transferring title to the vehicle, making a title request from a government agency, and/or updating the title that is recorded with the government agency to include updated owner information. In some instances, the title may not be transferred if the funds transfer fails. Alternatively, the title transfer may be processed after the funds transfer is complete. The supplemental data layer 110 may also be employed to send the buyer an offer for insurance, purchase insurance, issue an insurance policy, and/or other operations.

In some examples, the supplemental data layer 110 may be used to send a real time offer of financing to the buyer. Such an offer may be a counter-offer to the seller's (e.g., the dealer's) offer of financing. Implementations may also enable a back-end loan to be presented to the seller as a payment, from the point of view of the seller. For example, a vehicle dealer may receive a payment, and a third party entity may be providing the funds as a loan to the buyer, such that the seller is not aware that a loan has been made. The supplemental data layer 110 may enable a real time loan application to be sent to the buyer. The buyer may fill out the application through an application executing on their user device, and the completed application may be communicated to the lender over the supplemental data layer 110. The lender may example the application, determine whether to approve the loan application, and (in the case of approval) release the funds to the dealer using the channel 106. The channel 106 may be used to communicate the funds for a down payment from the buyer, followed by a loan acquisition by lender, funds transfer to the seller, and title transfer from seller to buyer. Any or all of the steps described above may be automated or otherwise facilitated using the supplemental data communication capabilities of the channel 106.

In some examples, a user may be sent, from a third party such as an insurer, a real time offer to purchase insurance for a vehicle rental in response to detecting that the user is engaged in a transaction to rent a vehicle. The insurer may also use the supplemental data layer to send, to the rental company, information regarding the user who is renting the vehicle, such as user preferences, previously rented cars, recommendations, and so forth.

In some examples, the supplemental data layer may be employed to offer and provide micro-insurance to a vehicle renting user. If a user does not normally carry vehicle insurance (e.g., if they do not own a vehicle), but the user wants vehicle insurance while they are using a rented vehicle, the real time data capabilities of the supplemental data layer enable an insurer to provide real time insurance payment and activation for micro-insurance, to insure the user specifically for the period of time when the user is using the rented vehicle, and/or specifically for the distance that the user drives the vehicle.

Information regarding insurance claims settlement, repairs, annuities, and so forth may be sent to the user over the supplemental data layer, for example, in real time in response to detecting a transaction with a repair shop and/or detecting an accident (e.g., using telematics sensors, etc.). These and other features would be implemented in view of the relevant applicable insurance regulations. The supplemental data layer may also be used to incentivize the user to make certain purchases. For example, based on a detected payment for vehicle service at a repair shop, a third party such as an insurer could offer a discount on insurance based on a detected number of maintenance events (e.g., service appointments) exceeding a threshold number, thus rewarding the user for good maintenance habits.

In some instances, a third party such as an insurer could use the channel to pay a merchant in real time for an insurance claim. For example, a windshield may be damaged and a mobile glass repair service may arrive on site to fix the windshield of the insured user. The repair service may be paid using the transaction data layer of the channel, and the insurance claim processing may be handled in real time using the supplemental data layer of the channel. Similar processing may be performed for purchases from merchants to replace stolen items that are covered by an insurance policy. An insurance claim may be used as the event that triggers the payment to the repair shop, merchant, and so forth. As another example, after repairing a vehicle, the repair shop may not release the vehicle until the shop has received the deductible. An insurer could use the channel to pay the deductible in real time. In general, the interaction of claims with final real time payments may be managed over the channel using the transaction data layer in conjunction with the supplemental data layer, to minimize the delay in starting a repair, replacing an item, and so forth. If the insured user lacks sufficient funds to pay a repair shop, for example, an insurer may offer a micro-loan on the back end to ensure that the user can use their vehicle immediately, and such a micro-loan may be processed using the supplemental data layer as described above.

An insured could determine that the user needs the micro-loan based on user-provided information, or other data regarding the user. Implementations provide for a combination of the payment and the processing of the insurance loan in real time. The micro-loan may be provided to enable a user to pay a deductible associated with a vehicle insurance claim, or other type of insurance claim. The channel may be employed to send the payment, corresponding to the micro-loan, to the repair shop. The supplemental data layer may also be used to offer a discount if maintenance is done with regularity, as described above. Any or all of these payments and/or data may be communicated over the channel 106.

Implementations also support the real time offer and/or processing of applications for insurance to cover other types of items, other than vehicles. For example, a third party insurer could monitor transactions over the channel and detect large value purchases for electronics, appliances, etc., and make a real time offer of an insurance policy to cover the purchased items (e.g., real time relative to the transaction). Offer of the policy, the user's acceptance, issuance of the policy, and collecting a premium may all be performed in real time using the supplemental data layer. Similarly, a user may be offered travel insurance based on detecting the purchase of an air fare, hotel room, etc. Short term insurance policies could also be offered for small items that are borrowed by the user. For example, the user could borrow the surfboard owned by another individual, and the owner of the surfboard could ask the user to take out an insurance policy to cover damage to, or loss of, the surfboard. A third party insurer could offer the policy, and receive approval and payment in real time using the channel. In general, the supplemental data layer could enable insurance policy offers, approval and issuance to occur in real time along with whatever payments are received to activate the policy.

In some implementations, a request-to-pay feature may be supported through the channel and its supplemental data layer. For example, a first user may need help paying a bill, and may send the bill information to a second user who consents to pay the bill for the first user. In some instances, the information that is sent to the second user may be filtered to remove, or obfuscate, the particular details such as the account number, account balance, and so forth, to preserve the privacy of the first user. The funds to pay the bill may be automatically taken from the second user's account, and sent directly to an electric bill payment system, instead of being sent to the first user's account. The supplemental data layer may facilitate such functionality. Additionally, a merchant could send a request to pay invoice to a second user designated as the payer by the first user.

In some instances, an entity (e.g., bank or other institution) may provide a debt consolidation loan to a user, the channel may be used to ensure that the loaned funds are actually used to pay off the user's various debts. For example, the lender may make the payments directly to the parties that are owed by the user, with the user's permission. Payments may be made in real time, and the supplemental data layer may be used to convey information identifying the user (e.g., user name, identification number), the debts or accounts being paid off (e.g., account number), and/or other relevant information. The supplemental data layer may also be used to convey information to close the account(s) that are paid off on behalf of the user and with the user's authorization, instead of relying on the user to do that themselves. The supplemental data layer may also convey information confirming that the account(s) have been closed.

In some instances, such as where a user is unable to use a personal check to make a payment (e.g., e.g., if a landlord does not trust the user's check), an entity may use the channel to make a payment in place of a check, on behalf of the user. The supplemental data layer can be used to send certification information indicating that the paying entity (e.g., financial institution) certifies these funds. The funds may be sent to the recipient's account with the certification information (e.g., such as a digital certificate or other security credential) in real time, as a certified electronic payment. The user may authorize this payment to be made directly as a push payment to the account of the recipient. In this example, the communication of certification information over the supplemental data layer may provide the recipient with confidence that the funds will be made available in real time.

Figure 3:
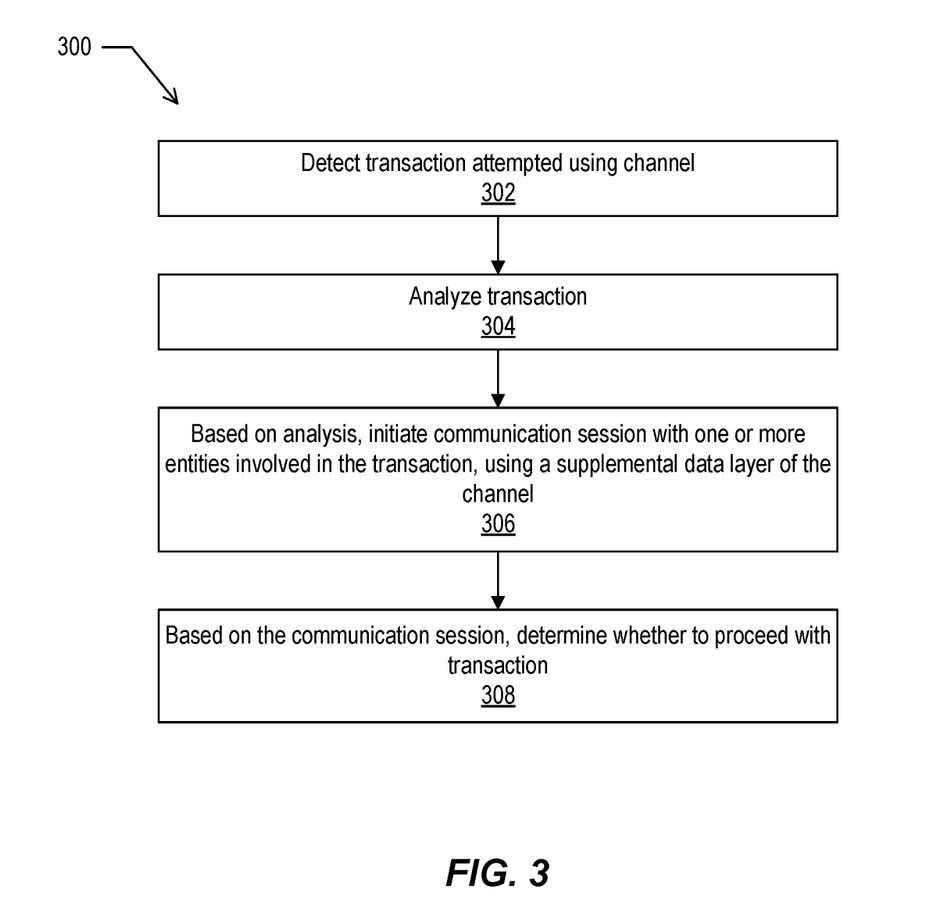
FIG. 3 depicts a flow diagram of an example process for interceding in a transaction using a supplemental data layer, according to implementations of the present disclosure.

FIG. 3 depicts a flow diagram 300 of an example process for interceding in a transaction using a supplemental data layer, according to implementations of the present disclosure. Operations of the process may be performed by software module(s) executing on one or more of the user device 104(1), the user device 104(2), the institutional server device(s) 112(1), the institutional server device(s) 112(2), the third party device(s) 114, and/or elsewhere.

A requested or attempted transaction (e.g., purchase) is detected (302), the transaction being requested or attempted over the channel 106. The transaction is analyzed (304). Based on the result of the analysis, a communication session may be initiated (306) using the supplemental data layer 110. The session may enable communication between one or more of the parties involved in the transaction and/or third parties who may intercede in some way to prevent, facilitate, or provide real time information regarding the transaction.

The session may be an interactive session between the parties, with communications during the session being carried over the supplemental data layer. Based on the communication session, a determination may be made (308) whether to proceed with the transaction or to not proceed with the transaction.

For example, based on detecting a possible purchase by a user over the transaction data layer, an entity (e.g., bank, financial counseling service, and so forth) can offer real time financial counseling to help the user make a sound decision and/or avoid a mistake. In some instances, a purchase amount may be compared to a budget, financial plan, spending rule, and/or other constraints put in place on a user's account by the user. Based on that comparison, an interceding party may advise the user not to make the purchase if the purchase amount would exceed a budget limitation or other constraint. The interceding party could help the user, in real time with respect to an attempted purchase, to make sound decisions even with respect to relatively small items such as bottle of water, cup of coffee, etc., which may add up quickly if a user has a limited monthly spending budget. The interceding party can also use the supplemental data channel to send real time advertisements, recommendations, and/or other information regarding savings opportunities, such as an offer to move a certain amount (e.g., an additional two dollars) to savings along with the transaction.

In some instances, the interceding party may be able to stop the user from making a purchase (e.g., block the transaction). Alternatively, the supplemental data layer may be used to provide information to the user after the transaction, such as advice to avoid such purchases in the future. The supplemental data layer may also be used to provide real time recommendations to the user to suggest moving money between accounts, for example, from a checking account to a savings account. Such recommendations may be provided to help the user save if they have extra money in a spending account in a particular month.

If a transaction fails due to insufficient funds in the user's account, an entity can detect that shortfall and use it as an opportunity to offer the user a (e.g., low interest and/or short term) loan to cover the shortfall. In such instances, an interceding entity may offer real time advice or counseling as described above, and/or initiate a funds transfer from another account to cover the shortfall (e.g., with user permission). An entity may also provide a real time service so that the user with the shortfall can ask another user for a transfer, e.g., as a person-to-person loan or gift. The user may specify, in real time, which account to use to process the transaction, or open another account (e.g., a virtual credit card account) in real time in response to a transaction. These actions may provide real time overdraft protection for the user, for each detected transaction. Moreover, through loan sharing, the user may be offered a loan that has multiple lenders instead of an individual lender. In these examples, the information may be conveyed over the supplement data layer in real time with respect to funds transfers performed over the transaction data layer.

Figure 4:
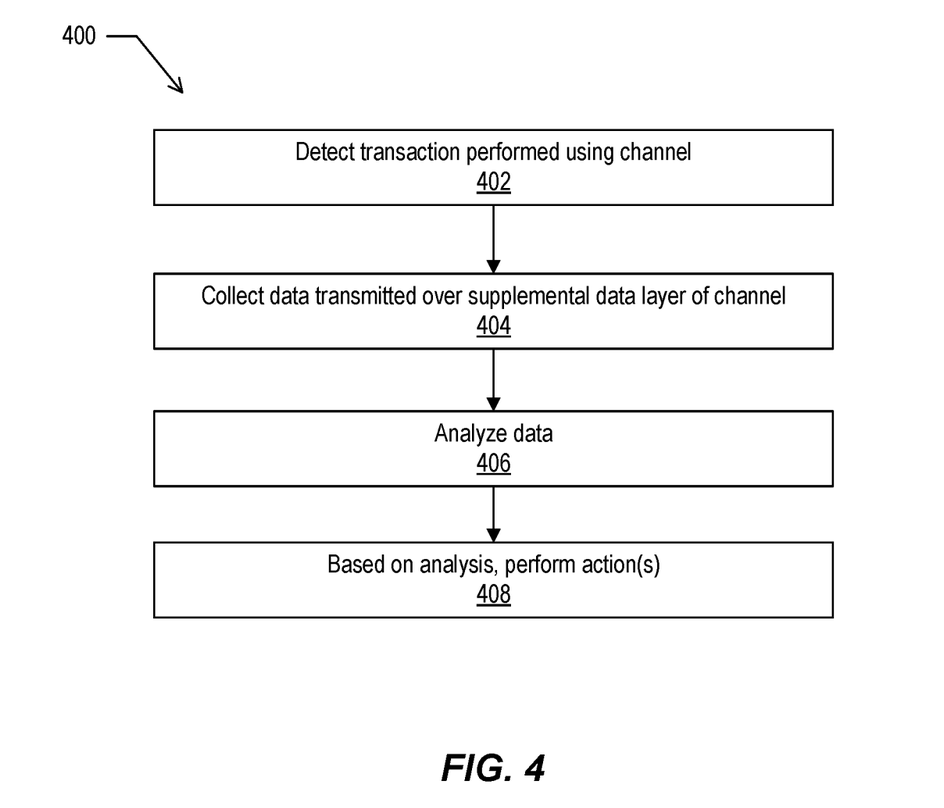
FIG. 4 depicts a flow diagram of an example process for collecting and analyzing data sent over a supplemental data layer, according to implementations of the present disclosure.

FIG. 4 depicts a flow diagram 400 of an example process for collecting and analyzing data sent over a supplemental data layer, according to implementations of the present disclosure. Operations of the process may be performed by software module(s) executing on one or more of the user device 104(1), the user device 104(2), the institutional server device(s) 112(1), the institutional server device(s) 112(2), the third party device(s) 114, and/or elsewhere.

A transaction is detected (402), such as a transaction performed over the transaction data layer of the channel. Data that is transmitted over the supplemental data layer (e.g., in real time with respect to the transaction), is collected (404). The data is analyzed (406) and, based on the analysis, one or more actions may be performed (408).

In some implementations, the supplemental data that is communicated in real time with respect to a transaction may be collected and analyzed to determine various actions that may be performed. In some instances, the analysis is performed in real time with respect to the transaction. Alternatively, the data may be collected and stored in real time, and analyzed later. In some instances, the supplemental data may be collected and analyzed for a single transaction. In some instances, the supplemental data for multiple transactions may be collected and analyzed as aggregate data. The analysis of individual data and/or aggregate data may be performed to identify possible fraud, criminal activity, or other types of malfeasance. In some implementations, the aggregate data may be analyzed to identify trends with regarding to purchases made among a population of users, and such information may be used for marketing or other purposes.

Implementations support the use of the supplemental data layer in other scenarios in addition to the examples described above. Such scenarios include, but are not limited to, the following:

Additional information may be exchanged with merchants at a POS terminal, where such information is communicated over the supplemental data layer.

A third party entity may analyze the supplement data to determine possible fraud, and such fraud data may be shared with merchants or other entities using the supplemental data layer.

Based on detected purchase(s) over the channel, an entity can use the supplemental data layer to offer preferred status, points, rewards, discounts, and/or other benefits to a user.

Advertisements and/or other messages could be sent to the user using the supplemental data layer. Such advertisements could be context-based, based on the detected purchase. For example, on detecting a transaction to purchase item X, the supplemental data layer may be used to communicate, to the purchaser, an offer to purchase item Y, based on a determination that purchasers of item X exhibit a high likelihood of purchasing item Y.

The channel, with the supplemental data layer, may be employed to facilitate bill splitting between multiple users (e.g., roommates paying a utility bill, diners splitting a bill, etc.). Such bill splitting may be performed over a period of time, such as leveling out a monthly utility bill by setting aside some funds per paycheck, where the bill may be higher in some months and lower in other months.

The channel may be used to provide certified funds in instances where such a certification is called for in real time with respect to a purchase, such as during an auction for real property, vehicles, artwork, and/or other items. The channel may also be used to provide certified funds in other instances where timeliness is appropriate, such as paying bail, paying bills that are late (or almost late), making payments to prevent repossession of property, credit payoffs, and so forth.

Figure 5:
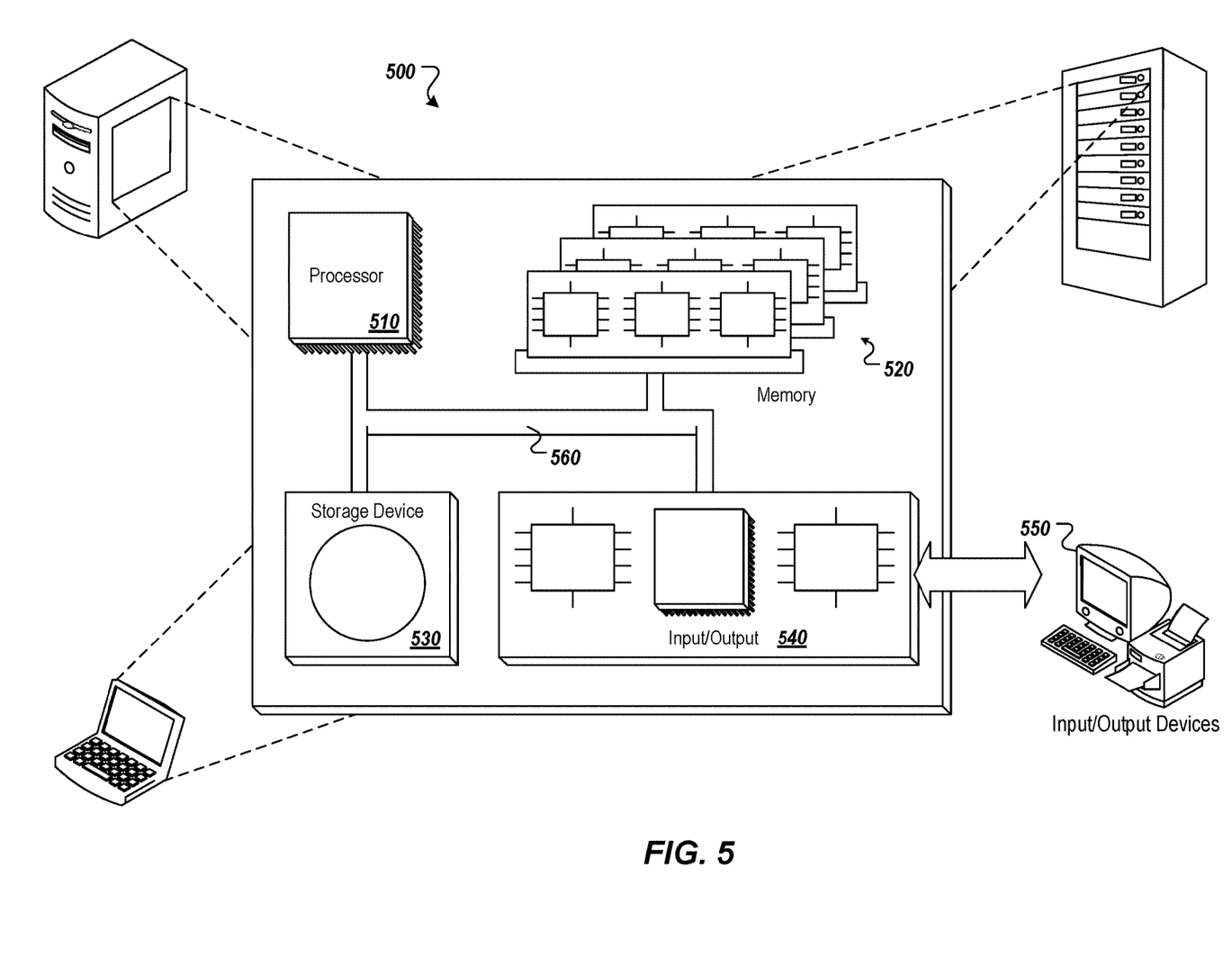
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the device(s) 104(1), 104(2), 112(1), 112(2), and/or 114, and/or other computing device(s) or system(s) described herein. The system 500 may include one or more processors 510, a memory 520, one or more storage devices 530, and one or more input/output (I/O) devices 550 controllable via one or more I/O interfaces 540. The various components 510, 520, 530, 540, or 550 may be interconnected via at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. For example, the processor(s) 510 may execute instructions for the various software module(s) described herein. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more communication networks using any network protocol.

Computing devices of the system 500 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth.

Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A method performed by at least one processor, the method comprising:
    detecting, by at least one processor, transaction data, the transaction data:
        representing a payment to be made by a user to an account of a recipient, wherein the payment is a certified electronic payment for a purchase during an auction for a real property, a vehicle, or an artwork; and
        wherein the transaction data representing the payment for the purchase during the auction for the real property, the vehicle, or the artwork is transmitted, over at least one network, using transaction data layer of a communication channel that provides both the transaction data layer and a supplemental data layer;
    in response to detecting the transaction data transmitted by the transaction data layer of the communication channel, processing, using the supplemental data layer of the communication channel, data representing certification information indicating that a financial institution certifies a fund for making the certified electronic payment on behalf of the user in real time;
    receiving an authorization of the user to make the certified electronic payment to the account of the recipient;
    in response to receiving the authorization, transmitting, by at least one processor and using the supplemental data layer of the communication channel, to the account of the recipient, supplemental data comprising (i) payment information indicating that the certified fund is sent to the account of the recipient as the certified electronic payment and (ii) the certification information by using the supplemental data layer of the communication channel,
    wherein transmitting the supplemental data comprises: transmitting the certification information in real time in response to detecting the transaction data.

2. The method of claim 1, wherein the payment is required to be made using a certified fund.

3. The method of claim 1, wherein the certification information includes a digital certificate of the fund.

4. A system comprising:
    at least one processor; and
    a memory communicatively coupled to the at least one processor, the memory storing instructions which, when executed, cause the at least one processor to perform operations comprising:
    detecting transaction data, the transaction data:
        representing a payment to be made by a user to an account of a recipient, wherein the payment is a certified electronic payment for a purchase during an auction for a real property, a vehicle, or an artwork; and
        wherein the transaction data representing the payment for the purchase during the auction for the real property, the vehicle, or the artwork is transmitted, over at least one network, using transaction data layer of a communication channel that provides both the transaction data layer and a supplemental data layer;
    in response to detecting the transaction data transmitted by the transaction data layer of the communication channel, processing, using the supplemental data layer of the communication channel, data representing certification information indicating that a financial institution certifies a fund for making the certified electronic payment on behalf of the user in real time;
    receiving an authorization of the user to make the certified electronic payment to the account of the recipient;
    in response to receiving the authorization, transmitting, by at least one processor and using the supplemental data layer of the communication channel, to the account of the recipient, supplemental data comprising (i) payment information indicating that the certified fund is sent to the account of the recipient as the certified electronic payment and (ii) the certification information by using the supplemental data layer of the communication channel,
    wherein transmitting the supplemental data comprises: transmitting the certification information in real time in response to detecting the transaction data.

5. The system of claim 4, wherein the payment is required to be made using a certified fund.

6. The system of claim 4, wherein the certification information includes a digital certificate of the fund.

7. One or more non-transitory computer-readable storage media storing instructions which, when executed, cause at least one processor to perform operations comprising:
    detecting transaction data, the transaction data:
        representing a payment to be made by a user to an account of a recipient, wherein the payment is a certified electronic payment for a purchase during an auction for a real property, a vehicle, or an artwork; and
        wherein the transaction data representing the payment for the purchase during the auction for the real property, the vehicle, or the artwork is transmitted, over at least one network, using transaction data layer of a communication channel that provides both the transaction data layer and a supplemental data layer;
    in response to detecting the transaction data transmitted by the transaction data layer of the communication channel, processing, using the supplemental data layer of the communication channel, data representing certification information indicating that a financial institution certifies a fund for making the certified electronic payment on behalf of the user in real time;

receiving an authorization of the user to make the certified electronic payment to the account of the recipient;

in response to receiving the authorization, transmitting, by at least one processor and using the supplemental data layer of the communication channel, to the account of the recipient, supplemental data comprising (i) payment information indicating that the certified fund is sent to the account of the recipient as the certified electronic payment and (ii) the certification information by using the supplemental data layer of the communication channel, wherein transmitting the supplemental data comprises: transmitting the certification information in real time in response to detecting the transaction data.

8. The system of claim 7, wherein the payment is required to be made using a certified fund.

9. The system of claim 7, wherein the certification information includes a digital certificate of the fund.

\* \* \* \* \*